United States Patent [19]

Bocci et al.

[11] Patent Number: 4,891,812
[45] Date of Patent: Jan. 2, 1990

[54] METHOD AND APPARATUS FOR SELECTING A DIGITAL SIGNAL FROM A PLURALITY OF DIGITAL SIGNALS

[75] Inventors: Paul M. Bocci, Roselle; Kevin M. Cutts; Carl M. Pietrzak, Jr., both of Schaumburg, all of Ill.

[73] Assignee: Motorola, Inc., Schaumburg, Ill.

[21] Appl. No.: 806,989

[22] Filed: Dec. 9, 1985

[51] Int. Cl.⁴ ............................................. G06F 11/00
[52] U.S. Cl. ................................ 371/5.5; 371/16.1; 371/36
[58] Field of Search .......................................... 371/5-7, 371/15-16, 22, 30, 36, 47-48, 67-69, 71

[56] References Cited

U.S. PATENT DOCUMENTS

| | | | |
|---|---|---|---|
| 3,667,057 | 5/1972 | Pfersch, Jr. et al. | 328/156 |
| 3,681,578 | 8/1972 | Stevens | 371/36 X |
| 4,214,213 | 7/1980 | Ferrie | 328/117 |
| 4,225,961 | 9/1980 | Raggenbass et al. | 371/36 |
| 4,328,581 | 5/1982 | Harmon et al. | 371/5 X |
| 4,342,112 | 7/1982 | Stodola | 371/68 |
| 4,375,101 | 2/1983 | Cerracchio | 371/69 |
| 4,375,683 | 3/1983 | Wensley | 371/36 |
| 4,442,531 | 4/1984 | Gupta | 371/36 X |
| 4,562,575 | 12/1985 | Townsend | 371/36 X |
| 4,583,224 | 4/1986 | Ishii et al. | 371/36 |

Primary Examiner—Emanuel S. Kemeny
Attorney, Agent, or Firm—Thomas G. Berry; Steven G. Parmelee

[57] ABSTRACT

In a mobile communications system, a plurality of base stations may receive the same signal, whereby the "best" reception may be determined. The plurality of received digital signals are combined to form a majority signal. Each of the received digital signals is compared to the majority signal to estimate the bit-error-rate (BER) of each received signal. If the difference between the highest and lowest BER is less than a predetermined threshold, the majority signal is selected for reception. Conversely, if the BER difference is greater than the predetermined threshold, the received digital signal with the lowest BER is selected for reception. Thus, the signal with the lowest BER is selected to provide the best possible communications.

10 Claims, 3 Drawing Sheets

METHOD AND APPARATUS FOR SELECTING A DIGITAL SIGNAL FROM A PLURALITY OF DIGITAL SIGNALS

BACKGROUND OF THE INVENTION

This invention relates generally to receiver selection and more particularly to a system for selecting the highest quality signal from a plurality of received digital signals.

To implement a total area coverage or wide area coverage sytem, it is known in the at to provide a plurality of receiver sites to receive and relay the same information signal to a central receiving location. Generally, one or more of the plurality of received signals will have superior signal quality when compared to the other signals. In the mobile or portable communication environment, the signal having the highest signal quality may rapidly change as the mobile transceiver proximity to a particular receiver site changes. Accordingly, it is necessary to continually determine which of the incoming plurality of received signals has superior signal quality and select that signal to be received at the central receiving location.

In an analog modulation communication system, it is known to select the signal upon the basis of signal strength or received signal power. This simple criteria is generally sufficient in an analog system since the relative phases of the received signal are less critical to the selection criterion thatn in a digital modulation system. However, to select a signal from a plurality of received digital signals, signal strength is generally not a sufficient criterion upon which to base the signal selection because of the additional parameter of the signal bit-error-rate (BER). A signal may have a higher signal power compared to other received signals and also have a higher BER thereby making that signal undesirable overall. Some selection systems have simply reconverted the digital signal into an analog signal and compared signal power as in the prior analog modulation communication systems.

In a secure communication system, decrypting the signal is undesirable since to decrypt the signal a receiver site requires the encryption key used to encrypt the digital signal. Remote decoding is contrary to the security of the system since there will be sections in the receiver where the voice message is no longer secure. Further, it is common in secure communication systems to periodically change the encryption key to prevent the compromise of system security. This is particularly disadvantageous in a wide area coverage system that employs several receivers in a diverse geographic ara. To change the encryption key in each receiver would result in wasted time and inefficient system use since the system would be inoperative until all receivers were programmed with the new encryption key.

Some digital selection systems have combined the plurality of received signals into a majority signal on the theory that if a majority of the received signals "thinks" the received bit should be a logical "1" the resultant majority signal BER will necessarily be superior to any of the individual signals. Of course, the majority signal may not always have a superior BER since the mobile or portable transceiver could be in close proximity to a particular remote receiver site, thus providing one very high quality signal within the plurality of received signals. Conversely, it is also possible to be in an area where all of the plurality of received signals are of poor quality and the resultant majority signal quality is better than any of the particular received signals.

Other selection systems have improved upon the majority signal technique by comparing each of the incoming signals to the majoriy signal. If a particular received signal is of extremely poor quality (i.e., has a high BER) that signal is excluded from contributing to the majority signal so that the majority signal BER will not be degraded by the contribution of that particular signal. However, this is generally not desirable in a mobile environment because the transceiver may rapidly relocate to be within close proximity of the received signal that has previously been excluded due to its prior poor BER. This results ina lower quality majority signal since the now "best" signal is excluded from contributing to the majority signal.

Accordingly, the need exists to have a simple, inexpensive but reliable signal selection method that overcomes the detriments of the prior art.

SUMMARY OF THE INVENTION

Accordingly, it is an object of the present invention to provide a signal selection system that overcomes the detriments of the prior art.

It is a further object of the present invention to provide a signal selection system that operates on digital signals without the need of decoding the signals.

It is another object of the present invention to provide a signal selection system which does not exclude a poor quality received signal, but also does not select a degraded majority signal for reception.

It is the ultimate object of the present invention to provide a signal selection system which selects either the received signal having the highest signal qualityor, in the alternative, the majority signal to assure the best possible signal reception.

Accordingly, these and other objects are achieved in the present signal selection system by a majority comparison.

In practicing the invention, the plurality of received digital signals are combined to form a majority signal. Each of the received digitial signals is compared to the majority signal to estimate the BER of each received signal. If the difference between the highest and lowest BER is less than a predetermined threshold, the majority signal is selected for reception. Conversely, if the BER difference is greater than the predetermined threshold, the received digital signal with the lowest BER is selected for reception. According to the invention, a poor signal is not excluded from contributing to the majority signal since a particular received signal may be selected instead of the majority signal.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures in which like referenced numerals identify like elements, and in which:

DETAILED DESCRIPTION OF THE PREFERRED EMBODIENT

Figure 1:
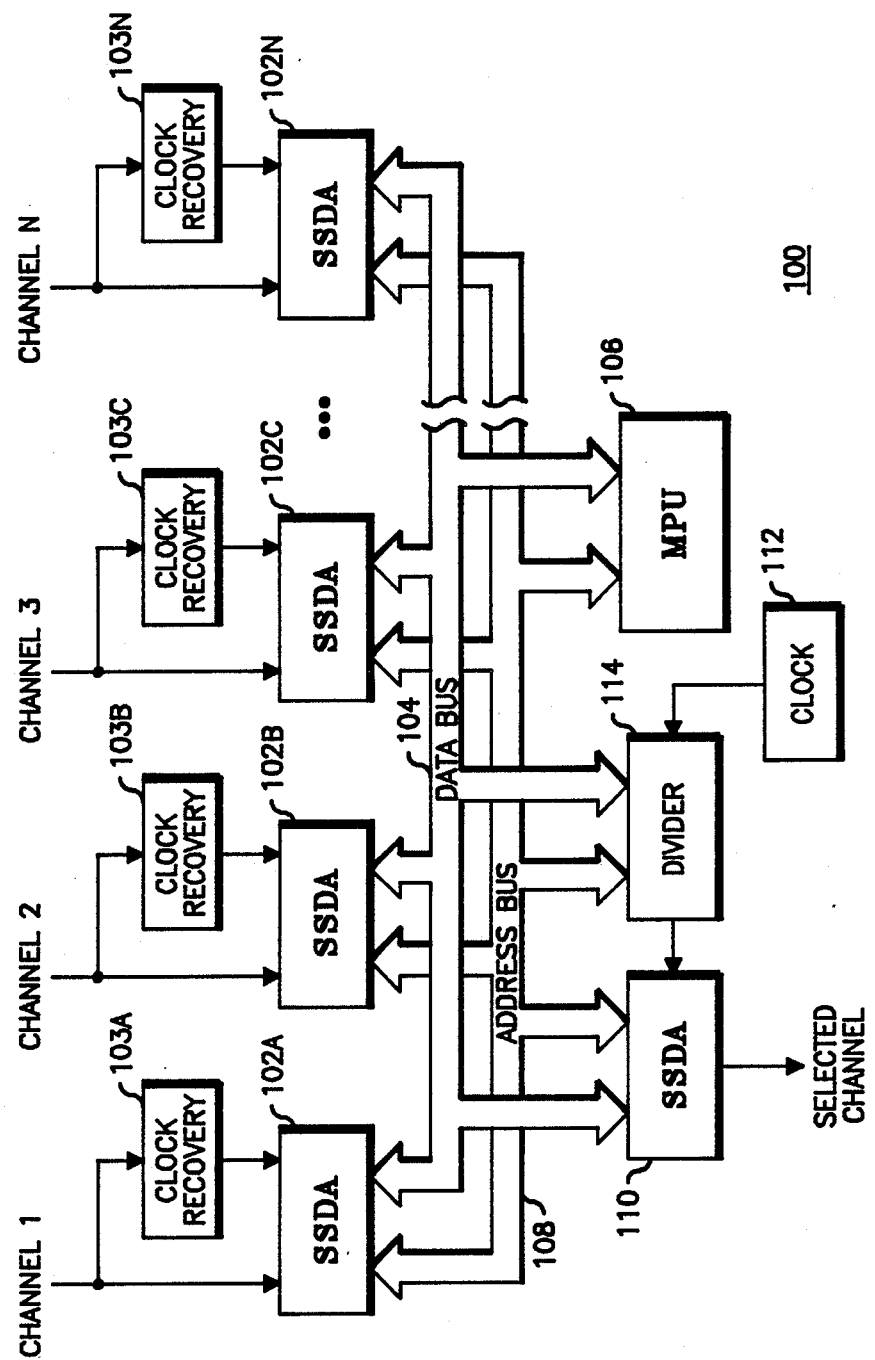
FIG. 1 is a block diagram of a signal selection system in accordance with the present invention.

In FIG. 1 there is shown a block diagram of the signal selection system 100 in accordance with the present invention. A plurality of received digital signals are coupled to a like plurality of synchronous serial data adaptors (SSDA) 102a–102N. The SSDAs 102a–102N are employed by the present invention to convert the serial data streams of the plurality of received signals into parallel bytes that may be transmitted via the data bus 104 to the microprocessor 106. Each SSDA 102a–102N receives a clock signal recovered from the digital signal it receives from a clock recovery device 103a–103N. The clock recovery devices may be any suitalbe device capable of recovering a clock signal from a digital signal. The clock recovery devices 103a–103N operate to allow the SSDAs 102a–102N to synchronously receive a particular digital signal without losing information bits. The SSDAs 102a–102N may be any device that adapts serial data into parallel data. In the preferred embodiment, each SSDA is an MC6852, manufactured by Motorola, Inc. The SSDAs 102a–102N are addressed by the microprocessor 106 via the address bus 108 to take a byte of data (representative of the 8 previous serial bits) for generation of a majority bit stream and selection of the "best" signal. The microprocessor 106 may be any suitable controller and in the preferred embodiment is an MC68000 availalbe from Motorola, Inc. The microprocessor 106 creates a majority signal by comparing all of the bits of each of the received digital signals and selecting for the logical state of a majority signal bit the majority "vote" of each of the received digital signals. For example, if the majority of the received channels agree that a particular bit is a "1" then the majority bit is a "1". Conversely, if the majority agree that the bit is a "0", then the majority bit is "0". Of course, if the plurality of channels comprises an odd number, there will always be a clear majorityas to which logical state the majority bit stream should assume. Howver, in those systems that have an even number of received channels, there is the possibility that there may be a like number of channels voting for a "1" to the number of channels voting for a "0". In these situations a random selection may be made for the majority bit stream since either choice has an equal probability of being correct. Once the majority signal has been created, each of the received signals is compared to the majority to determine the bit-error-rate (BER) of each of the received signal. In this fashion, the majority signal becomes the standard which determines the error rates of all the received signals. If the received signal agrees with the majority signal, there is no error, however, if the received signal disagrees with the majority signal an error count is made for that particular received digital signal. Following the BER determinations for each of the received signals, the microprocessor 106 compares the "best" signal (i.e., the lowest error rate) to the "worst" signal (i.e., the highest BER). If the difference between these two BERs is less than the predetermined threshold, the majority signal should be selected because, probabilistically, it will have the best (lowest) BER since the combination of all the receive channels under that criteria should result in a higher quality signal. However, if the difference between the best and worst received digital signal is greater than a predetermined threshold, the received signal with the lowest BER should be selected because it will have a better BER than the majority signal since the majority signal's BER would have been degraded by the wide disparity of the BERs of the received signals.

As an example, consider a system having three received digital signals. Assume that the first signal has an actual BER of 0.1%, and the second and third signals each have a BER of 5.0%. The majority signal generated from these signals would have a BER of 0.26%. Using the majority signal as the standard, the fist signal would be assumed to have a BER of 0.34%, and both the second and third signals would have their BER's estimated at 4.75%. Since the majority signal was used as the standard, the first signal's BER was estimated as worst than the majority when, in fact, it is better by greater than two-to-one. However, the present invention compares the difference between the estimated error rates (in this example 4.75−0.34=4.41) and selects the signal with the lowest BEr if the BER delta is greater than a predetermined threshold. Conversely, assuming now that each signal had an actual BER of 5.0%, the majority BER would be 0.725%. Using the majority signal as the standard results in an estimated BER of 4.75% for each of the received signals. The difference between the highest and lowest BER (now zero) would be below the threshold and the majority signal would be selected. Thus, in each example, the signal with the lowest BER is selected resulting in the best possible received signal.

The particular threshold used is stored as a table in a memory location. Those skilled in the art will appreciate that it is possible to compare every combination of the received signal's BERs to more precisely determine the probability of a selected received signal having a better BER than the combined majority signal. However, in practice, this is too time consuming and an acceptable determination may be made by simply comparing the best BER to the worst BER without regard to the "spread" of any intermediate BERs created by the remaining plurality of received signals.

Still referring to FIG. 1, once the determination is made on whether to select the majority signal or a particular received signal, the microprocessor 106 addresses an SSDA 110 via the address bus 108. The SSDA 110 is provided with an output clock signal from clock source 112, which is divided by an appropriate amount in divider 114. The divider 114 may be programmed by the microprocessor 106 via the address bus 104 and the data bus 104 to provide any suitable frequency. The selected signal is sent byte parallel to the SSDa 110, which converts the signal back into a serial bit stream to be received by any particular decoding means or reception apparatus that may be employed ina particular receiver implementation.

The determination of th selection of the majority signal or a particular received signal is continually made to select the signal having the highest quality (i.e., the lowest bit error rate). Thus, a received signal is never removed from the majority signal but is allowed to contribute irrespective of how poor the signal quality is. Therefore, if a mobile or portable device should later re-locate to be within close proximity to a previously poor quality channel, that signal may become the best signal and its exclusion would be detrimental to optimum system operation. Accordingly, an improved signal selection system is afforded by the present invention that continually selects highest quality communication possible.

Figure 2:
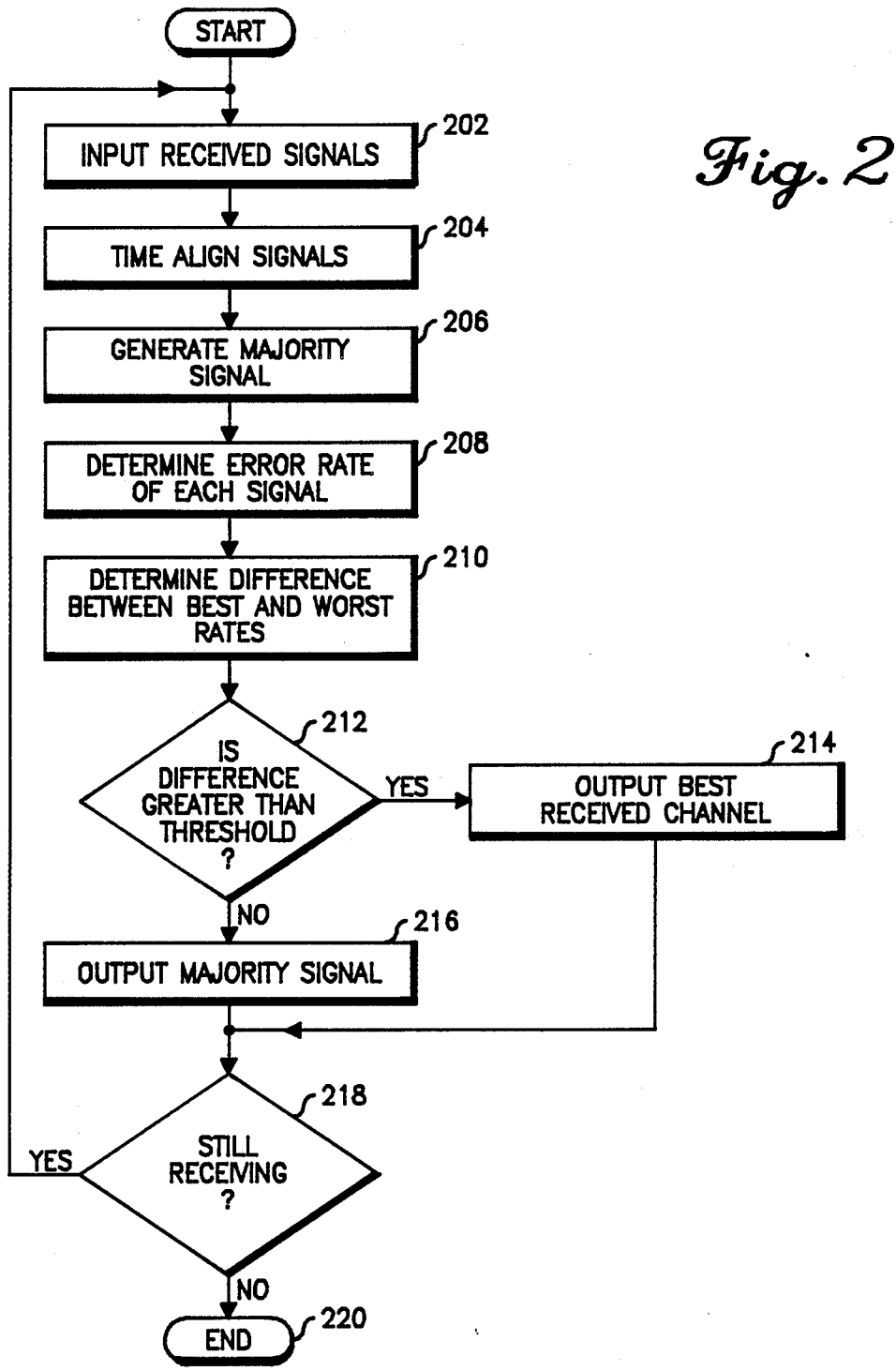
FIG. 2 is a flow diagram of the steps executed by the signal selection system of FIG. 1.

Referring now to FIG. 2, there is shown a flow diagram illustrating the steps executed by the microprocessor 106 of FIG. 1. The routine begins in input block 202 which receives the input data bytes from eacho f the SSDAs 102a–102N. Operation 204 time aligns the signals if required to assure that the proper bits are being compared. In step 206, the majority signal is generated by making a majority vote, but by bit, of each fo the received signals. Of course, if there is a "tie" between the votes of the received signals, a random selection may be made. After creating the majority signal, the routine continues to step 208, which determines the error rate of each signal by comparing it the the majority signal (which is used as the standard). Step 210 determines the difference between the best and worst (i.e., lowest and highest bit error rates). Decision 212 compares the BER difference to a predetermined threshold (the result of which will determine which signal is selected). If the determination of decision 212 is that the difference is greater than the threshold, the routine proceeds to output block 214 where the best received signal is selected. Conversely, if the determination of decision 212 is that the difference is not greater than the predetermined threshold, output block 216 selects the majority signal. In either event, the routing proceeds to decision 218 to determine whether or not a message (i.e., the plurality of signals) is still being received. If a message is still being received, the routing proceeds to reference numeral A to again input the plurality of received signals (in byte form) in input block 202. In this way, the signal selection determination is continuously made without excluding a "bad" signal. However, if the message has ended, decision 218 proceeds to control block 220, which ends the routine.

As previously mentioned, the difference between the best and worst channel is compard to a predetermined threshold. Those skilled in the ar will appreciate that this threshold may be determined in a number of fashions. One way, may be to allow the user of the system to arbitrarily select the threshold that he thinks is desirable. An alternative means of determining the threshold may be to experimentally select a value by using fields tests and "worst case" scenarios. The preferred embodiment determines this threshold by computer simulation.

Figure 3:
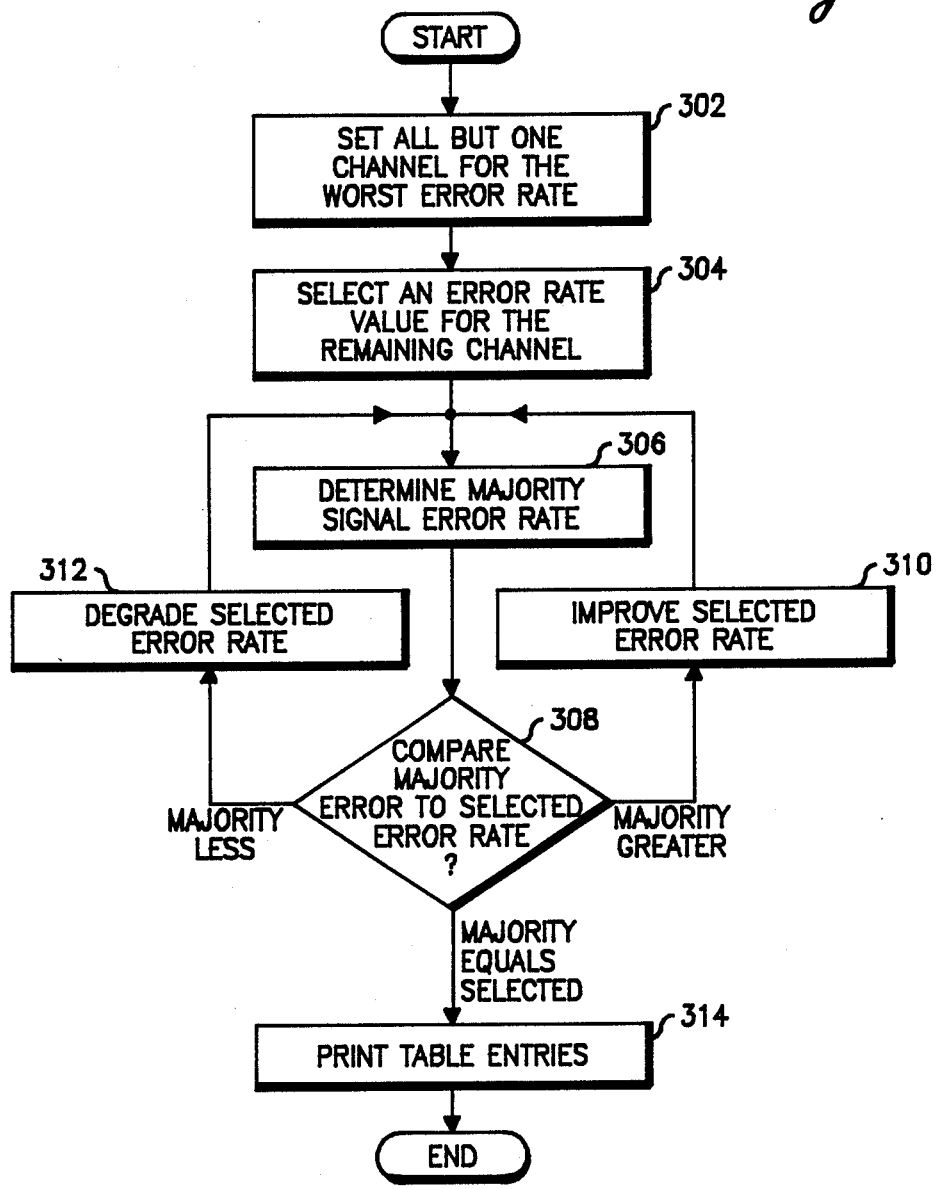
FIG. 3 is a flow diagram of the steps executed to generate the decision table used in the signal selection system of FIG. 1.

Referring now to FIG. 3, there is shown a flow diagram of the steps involved in determining the threshold value. In step 302, the number of channels for a particular system is determined and all but one ar set to a theoretical worst BER. In item 304, an error rate is selected for the remaining channel (the actual value is not particularly significant as will become apparent hereinafter). Step 306 determines the majority signal error rate by an estimation of what the majority signal would be compared with the "known" (i.e., pre-selected) error rates. Decision 308 compares the majority signal BER with the selectd BER of step 304. If the majority signal BER is greater, the routine proceeds to item 310, which improves (lowers) the selected BER and returns control to step 306 to recalculate the majority signal BER. However, if the majority signal BER is less than the selected BER, control is routed to step 312 which degrades (increases) the BER of the selected channel and returns to step 306 to recalculate the majority signal BER. The goal of steps 306, 308, 310 and 312, is to reach a point where the majority signal BER equals the selected BER, at which point the routine proceeds to item 314, which prints the selected determination of the threshold. This value may be stored in a memory table and used as the threshold in step 212 of FIG. 2.

While a particular embodiment of the invention has been described and shown, it should be understood that the invention is not limited thereto since many modifications may be made. It is therefore contemplated to cover by the present application any and all such modifications that may fall within the true spirit and scope fo the basic underlying principles disclosed and claimed herein.

What is claimed is:

1. A method for selecting an optimum signal from at least three received digital signals, comprising the steps of:
   (a) generating a majority signal from the at least three received digital signals by:
      (i) comparing, bit-by-bit, all of the at least three received digital signals;
      (ii) generating a majority signal bit having the same logical state as the majority of said compared bits of all of the at least three received digital signals, unless all of the at least three received signals comprises an even number of signals having a even distribution of alternate logical states, in which case a random selection of sai alternate logical states comprises said majority signal bit;
   (b) determining the error rate of each of the at least three received digital signals by individual bit-by-bit comparison with said majority signal; and
   (c) selecting a particular one of the at least three received digital signals if a predetermined condition is staisfied, else alternately selecting said majority signal.

2. The method of claim 1, which further includes the step of time-aligning the plurality of received digital signals.

3. The method of claim 1, wherein said predetermined condition is the difference between a highest error rate and a lowest error rate determined in step (b).

4. The method of claim 1, which further includes the step of processing either said majority signal or said selected one of the received digital signals to provide a recovered signal.

5. The method of claim 4, wherein said processing step comprises decoding either said majority signal or said selected one of the received digital signals.

6. A method for selecting an optimum signal from at least three received digital ignals, comprising the steps of:
   (a) time-aligning the at least three received digital signals;
   (b) generating a majority signal from the at least three received digital signals by:
      (i) comparing, bit-by-bit, all of the at least three received digital signals;
      (ii) generating a majority signal bit having the same logical state as the majority of said compared bits of all of the at least rhee received digital signals, unless all of the at least three received signals comprises an even number of signals having a even distribution of alternate logical states, in which case a random selection of said alternate logical states comprises said majority signal bit;
   (c) determining the error rate of each of the at least three received digital signals by individual bit-by-bit comparison with said majority signal;

(d) selecting a particular one of the at least three received digital signals if a predetermined condition is satisfied, else, alternately selecting said majoritysignal; and (e) decoding said signal selected in step (d) to provide a recovered signal.

7. An apparatus for selecting an optimum signal from a plurality of received digital signals, comprising:

means for generating a majority signal from at least three received digital signals, comprising:

(i) means for comparing, bit-by-bit, all of the at least three received digital signals;

(ii) means for generating a majoority signal bit having the same logical state as the majority of said compared bits of all of the at least three received digital signals, unless all of the at least three received signals comprises an even number of signals having a even distribution of alternate logical states, in which case a randomselection of said alternate logical states comprises said majority signal bit;

means for determining the error rates of each of the at least three received digital signals; and means for selecting a particular one of the at least three received digital signals if a predetermined condition is satisfied, else, alternately selecting said majroity signal, whereby, all of the received digital signal are included in said comparison, of said generating means, and none are excluded from contributing to the generation of said majority signal.

8. The apparatus of claim 7, which further includes means for decoding either said majority signal or said selected one of the received digital signals.

9. The apparatus of claim 7, which further includes means for time-aligning the plurality of received digital signals.

10. An apparatus for selecting an optimum signal from at least three received digital signals, comprising:

means for time-aligning the at least three received digital signals;

means for generating a majority signal from at least three received digital signals, comprising:

(i) comparing, bit-by-bit, all of the at least three received digital signals;

(ii) generating a majority signal bit having the same logical state as the majority of said compared bits of all of the at least three received digital signals, unless all of the at least three received signals comprises an even number of signals having a even distribution of alternate logical states, in which case a random selection of said alternate logical states comprises said majority signal bit;

means for determining the error rate of each of the at least three received digital signals;

means for selecting a particular one of the at least three received digital signals if a predetermined condition is satisfied, else, selecting said majority signal; and means for decoding either said majority signal or said particular one of the at least three received digital signals to provide a recovered signal;

whereby, all of the at least three received digital signal are included in said comparison of said generating means, and none are excluded from contributing to the generation of said majority signal.

* * * * *

UNITED STATES PATENT AND TRADEMARK OFFICE
CERTIFICATE OF CORRECTION

PATENT NO. : 4,891,812
DATED : January 2, 1990
INVENTOR(S) : Bocci et al.

It is certified that error appears in the above-identified patent and that said Letters Patent is hereby corrected as shown below:

Col. 6, line 26, "sai" should be --said--.
Col. 6, line 34, "staisfied" should be --satisfied--.
Col. 6, line 50, "ignals" should be --signals--.
Col. 6, line 60, "rhee" should be --three--.
Col. 7, line 15, "majoority" should be --majority--.
Col. 7, line 31, "majroity" should be --majority--.

Signed and Sealed this

Fifteenth Day of January, 1991

Attest:

HARRY F. MANBECK, JR.

*Attesting Officer*  *Commissioner of Patents and Trademarks*